Figure 4A:
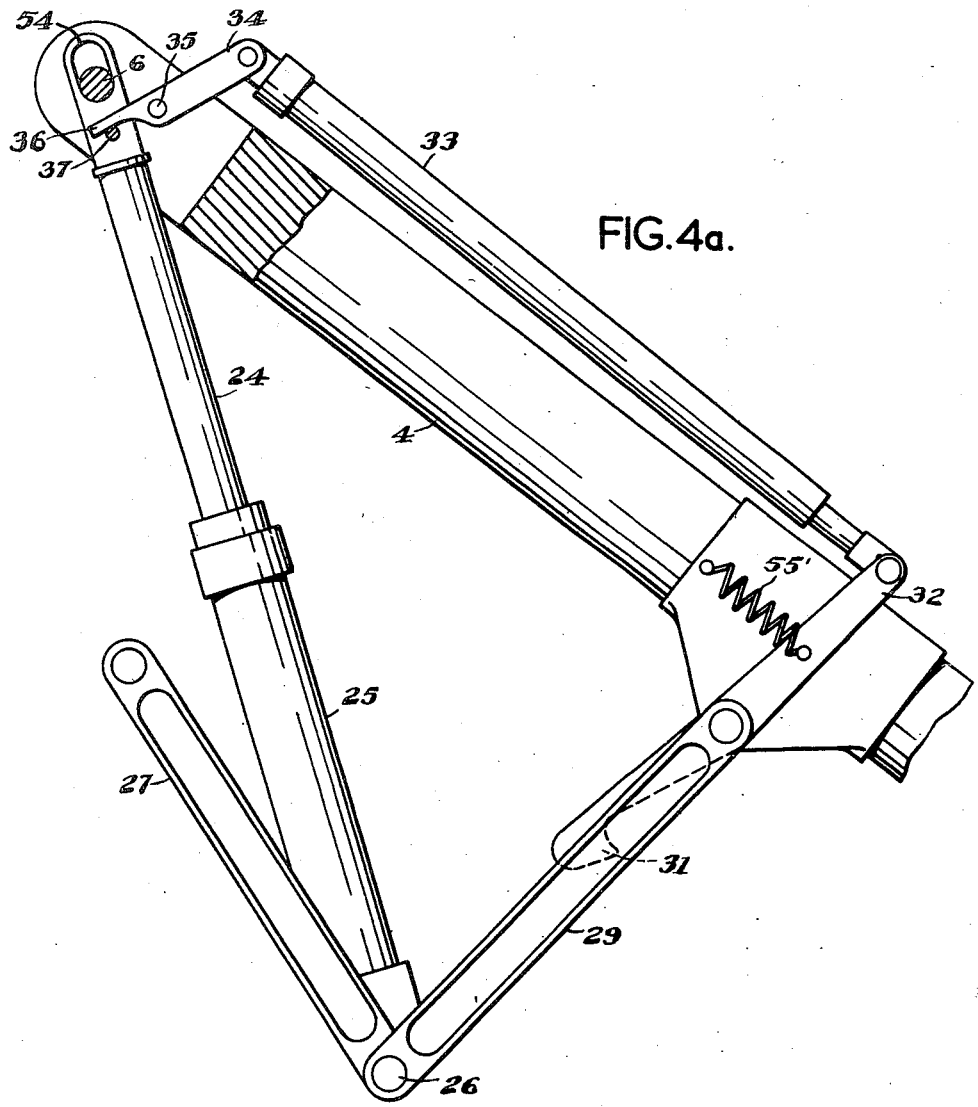

Oct. 5, 1954   J. PERDUE   2,690,887
RETRACTABLE UNDERCARRIAGE FOR AIRCRAFT
Filed April 21, 1950   6 Sheets-Sheet 1
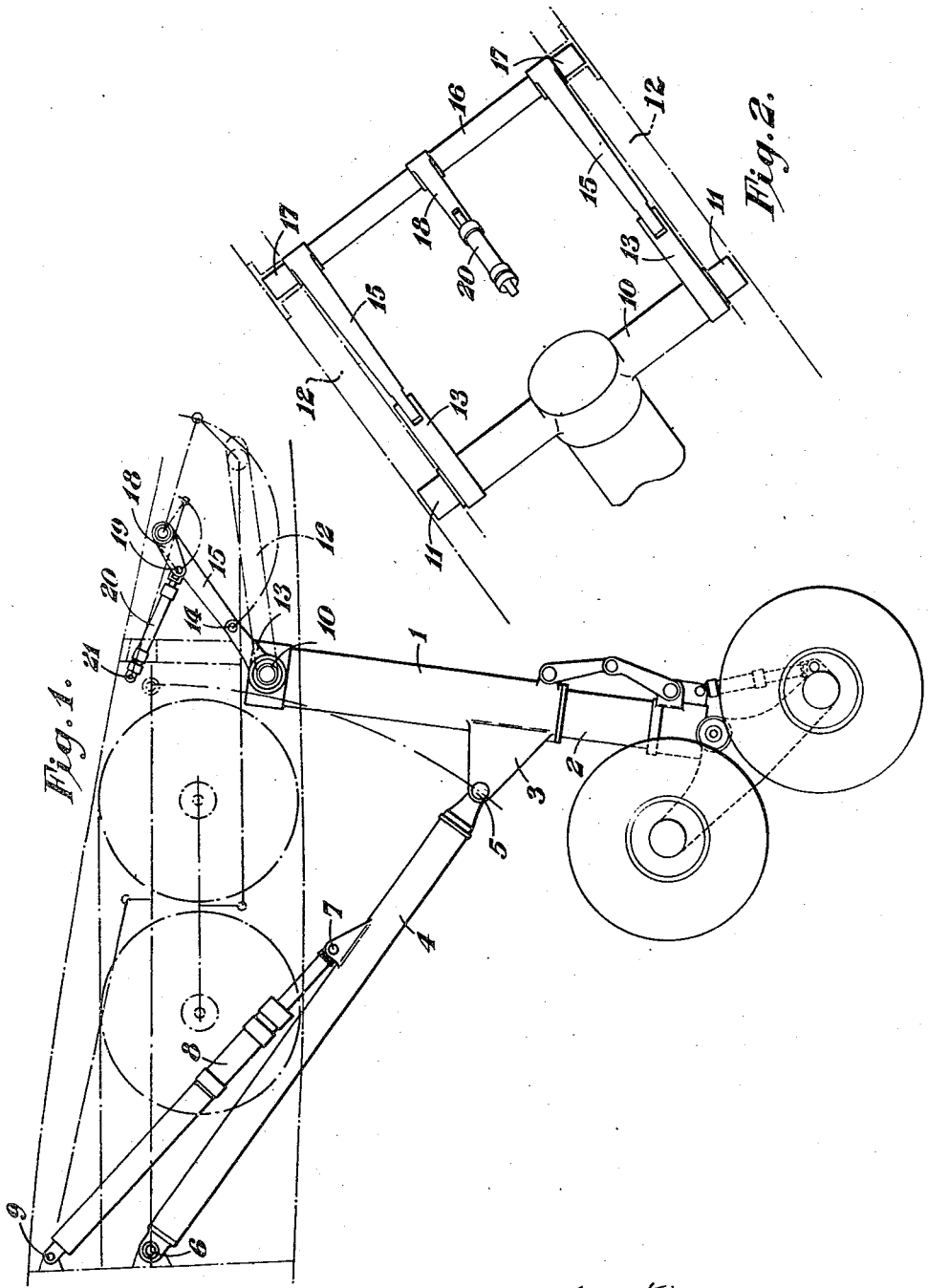
Inventor:
Jack Perdue;
By his attorneys,
Baldwin, Wight, & Prevost

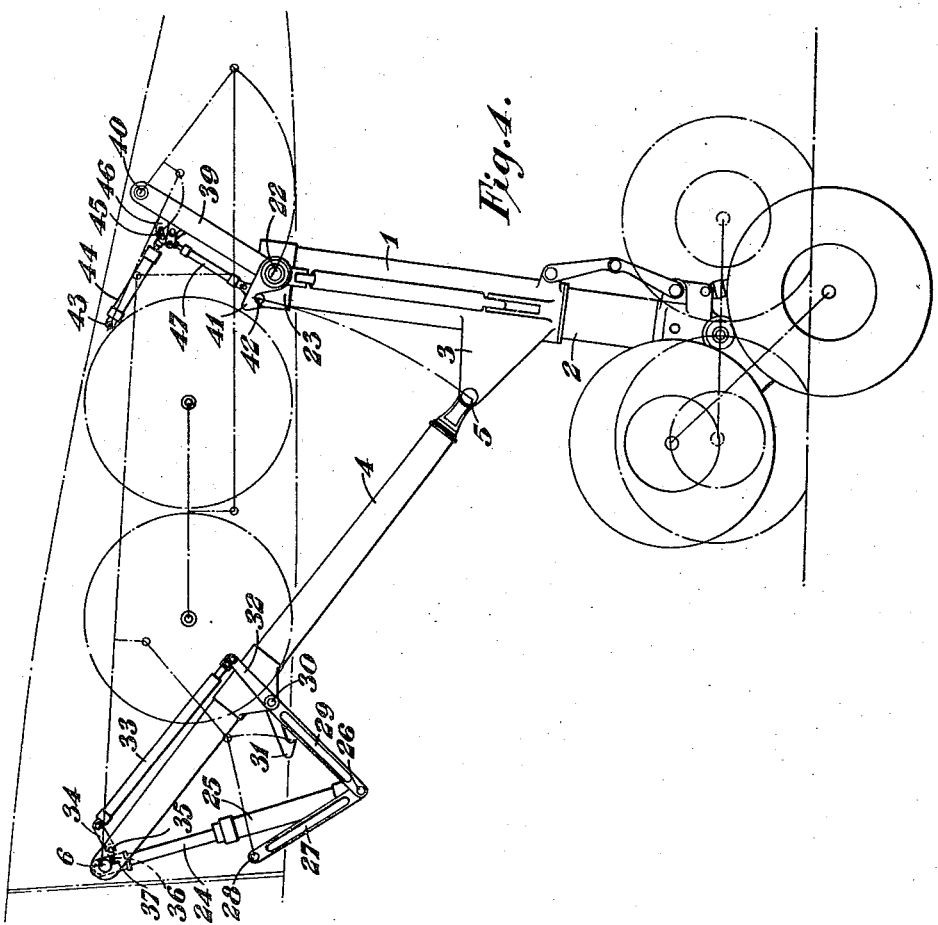

Oct. 5, 1954
J. PERDUE
2,690,887
RETRACTABLE UNDERCARRIAGE FOR AIRCRAFT
Filed April 21, 1950
6 Sheets-Sheet 4
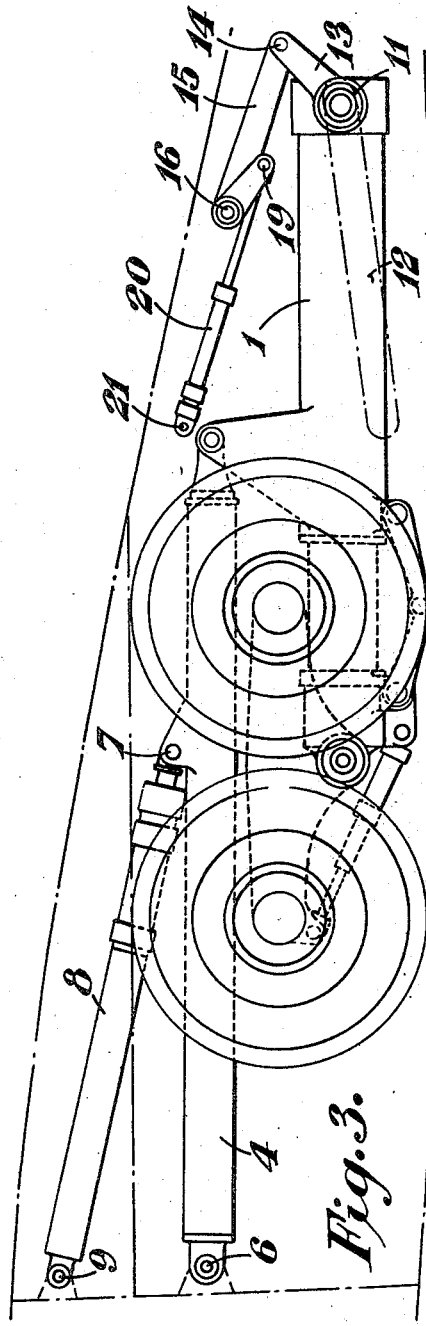
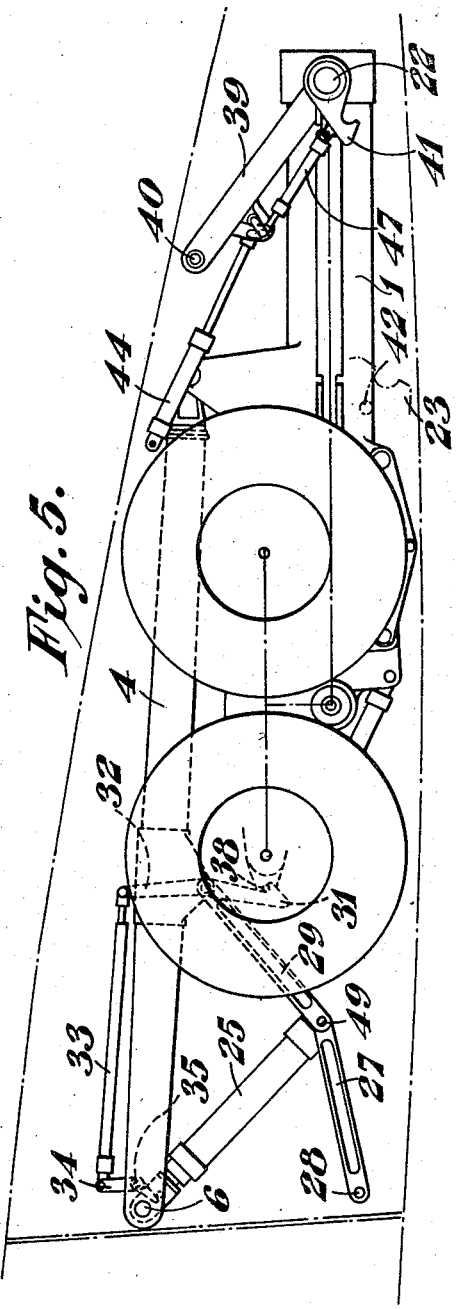
Inventor:
Jack Perdue;
By his attorneys,
Baldwin, Wight, & Brevost

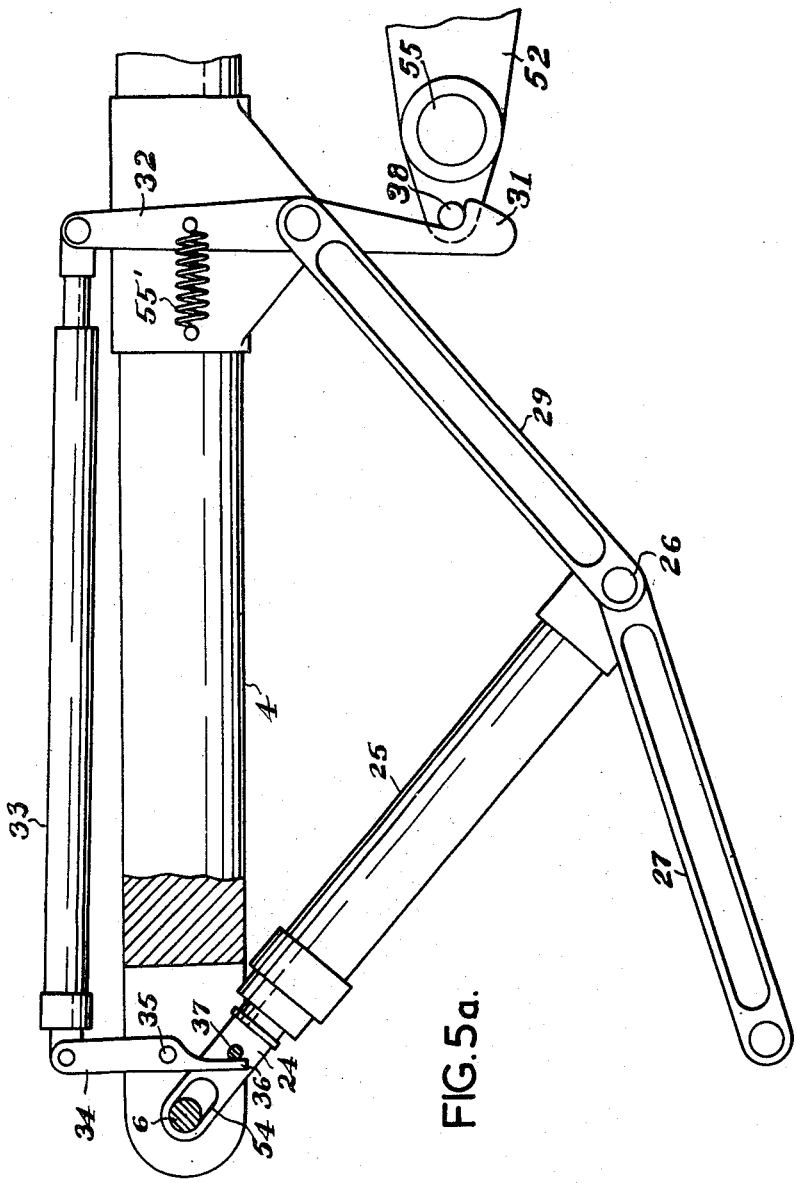

Oct. 5, 1954  J. PERDUE  2,690,887
RETRACTABLE UNDERCARRIAGE FOR AIRCRAFT
Filed April 21, 1950  6 Sheets-Sheet 6
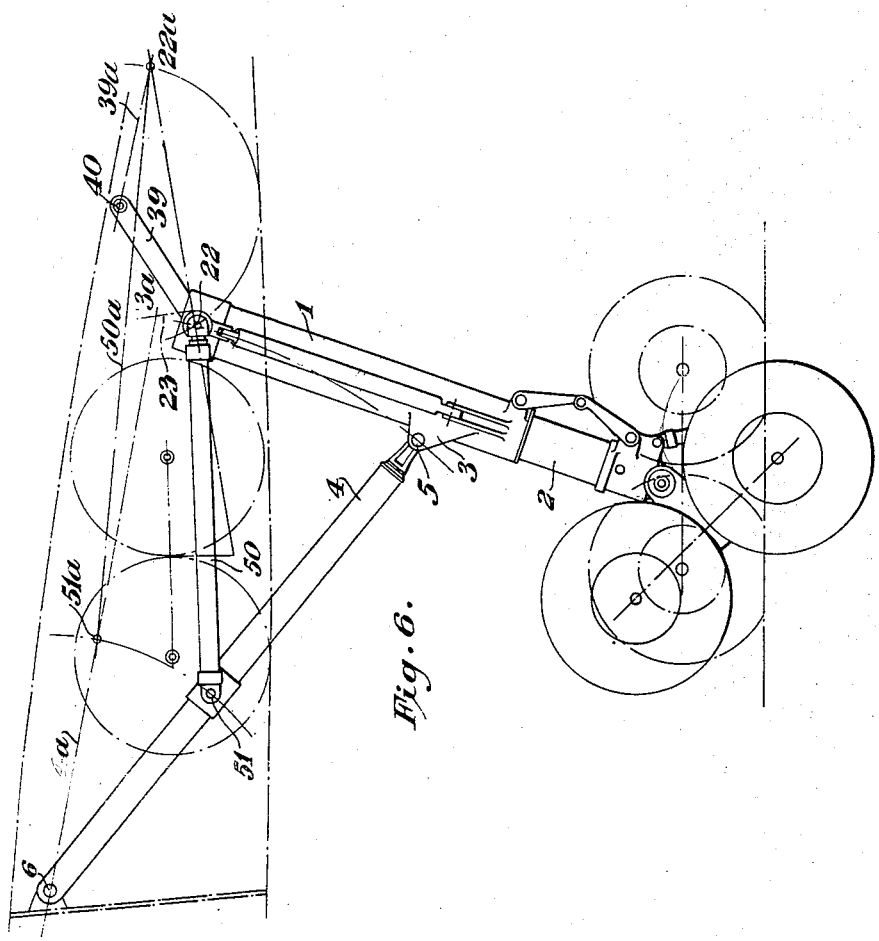
Inventor:
Jack Perdue;
By his attorneys,
Baldwin, Wight & Prevost Patented Oct. 5, 1954

2,690,887

UNITED STATES PATENT OFFICE 2,690,887

RETRACTABLE UNDERCARRIAGE FOR AIRCRAFT

Jack Perdue, Great Sankey, Warrington, England, assignor to Electro-Hydraulics Limited, Warrington, England, a company of Great Britain Application April 21, 1950, Serial No. 157,243

Claims priority, application Great Britain April 25, 1949

10 Claims. (Cl. 244—102)

This invention relates to retractable undercarriages for aircraft and more particularly to those in which the undercarriage is braced in its lowered position. In such braced undercarriages, the tendency has been to keep the attachment point of both the undercarriage and its bracing member to the aircraft fixed; thus the bracing member has had to be broken and folded to allow for retraction. Furthermore the bracing member, or any other member holding the undercarriage in its lowered position, had to be provided with locking means, so that the undercarriage did not retract, due to the impact on landing or taxiing.

One object of this invention is to overcome these disadvantages and to provide an aircraft undercarriage wherein the bracing member is not folded during lowering or retraction.

According to the present invention a retractable undercarriage for aircraft comprises a leg, including a resilient strut, provided with load transmitting means adapted to be held in a fixed position to the aircraft when the undercarriage is lowered, a rigid bracing member of fixed length pivoted at one end to the aircraft and at the other to the leg, guide means carried by the aircraft and pivotally related to the leg adapted to guide said leg during lowering and retraction of the undercarriage, and means for raising and lowering the undercarriage, said load transmitting means and bracing member transmitting substantially the whole landing loads of the undercarriage to the aircraft.

Guide means preferably in the form of one or more guide arms are provided on the leg for holding it fixed directly to the aircraft for load transmitting purposes when the undercarriage is lowered.

The means for raising and lowering the leg preferably comprises a jack which may be hydraulically or pneumatically operated. A subsidiary jack may be provided, which, on operation, causes the guide arms to assist the operation of the undercarriage during raising and lowering whereby the means of attachment of the undercarriage leg to the aircraft is moved relative to the point of attachment of the guide arms during retraction of the undercarriage.

In one embodiment the load transmitting bearings are supported in slots in the aircraft and, during movement of the guide arms, the bearings are moved with respect to the undercarriage.

Three forms of aircraft undercarriage according to this invention are diagrammatically illustrated in the accompanying drawings in which Figures 1, 2 and 3 show one form and Figures 4 and 5 a second and Figure 6 the third form.

Figure 1 is a side elevation, the undercarriage being shown extended in full lines; Figure 2 is a detail in plan and Figure 3 a view similar to Figure 1 but showing the undercarriage retracted; Figures 4 and 5 are views similar to Figures 1 and 3 of the other forms; Figures 4A and 5A are enlarged fragmentary side elevations of the bracing member and retraction jack of Figures 4 and 5, shown respectively in the lowered and raised positions of the parts, and Figure 6 is again a similar view of Figure 1 of further modified form.

Referring to the construction shown in Figures 1 to 3, the undercarriage leg 1 comprises a resilient telescopic shock absorber including a resilient strut 2 carrying landing wheels. The leg carries or has integral therewith a lug 3 to which is pivotally connected by a pin 5 one end of a bracing member 4, the other end of which is pivotally mounted to the aircraft through a pin 6. Pivotally connected at 7 to the bracing member 4 is one end of a retraction jack 8, the other end of which is pivoted at 9 to the aircraft. The undercarriage leg 1 carries or has integral therewith load transmitting means in the form of a yoke 10, the load transmitting bearings 11 of which ride in slots 12 in the aircraft fuselage. Pivotally connected to the yoke 10, one on either side of the undercarriage leg 1, are lugs 13 pivotally connected by pins 14 to guide arms 15, fixed to each of which is a torque bar 16 rotatably mounted in bearings 17 in the aircraft. The torque bar 16 has fixed thereto a lever 18 which is pivotally connected at 19 to a subsidiary jack 20 which is also pivotally connected at 21 to the aircraft.

The subsidiary jack may include an internal lock (not shown) of known construction so that any external load on landing or taxiing will not extend the subsidiary jack. In this case no other locking means will be necessary for landing and taxiing operations.

The undercarriage works in the following manner: When the undercarriage is lowered, the retraction jack 8 is extended and the subsidiary jack 20 is closed, so that the load transmitting bearings 11 of the yoke 10 are at the left hand end of the slots 12. In this position, a negligible load is exerted on the retraction jack, both on landing and on taxiing, whilst the load on the subsidiary jack 20, during these operations, will be very slight, due to the fact that the lugs 13 and guide arms 15 are substantially in line.

In order to retract the undercarriage, the subsidiary jack 20 is extended and the retraction jack 8 closed. Movement of the subsidiary jack 20 will pivot the lugs 13 and guide arms 15 outwardly and thus cause rotation of the leg 1 in an upward sense, around the yoke bearings 11, which will be caused to slide in the slots 12 until they reach the other extremity of the slots, i. e. the right hand end (see Figure 3).

Instead of arranging the lugs 13 and arms 15 so as to pivot outwardly these can, of course, be made to pivot inwardly on retraction, for example, by mounting the subsidiary jack 20 between the arms 15.

Due to the method of providing guide arms, it will be appreciated that the undercarriage can be accommodated in a shorter nacelle than would otherwise be possible, due to the fact that the load transmitting means of the undercarriage can alter position during rotation of the said guide arms.

Referring now to the construction shown in Figures 4, 4A, 5 and 5A the undercarriage leg 1 again comprises a resilient telescopic shock absorber including the resilient strut 2 and landing wheels, the top of the leg 1 carrying a pin 22 adapted to be held, when the undercarriage is extended, in half bearings 23 on the aircraft. The undercarriage leg 1 is provided with its normal lug 3 to which is pivotally connected one end of the bracing member 4, the other end of which is pivotally attached at 6 to the aircraft. Pivotally mounted on the same pivot point 6 to the aircraft is the piston rod 24 of a retraction jack 25, the other end of the jack being pivoted to the centre pivot point 26 of two arms, one 27 of which is pivotally connected at 28 to the aircraft, and the other 29 of which is pivoted at 30 to the bracing member 4. The said bracing member 4, adjacent this last pivot 30, pivotally carries a latch member 31 and carried by or integral with the latch member 31 is an arm 32 pivotally connected to a link 33 which in turn is pivotally connected to a lever 34, which pivots on a pin 35 fixed to the bracing member 4. The lever 34 terminates in a projection 36 which rests on a pin 37 carried by the piston rod 24 of the retraction jack 25. The latch 31 is capable of engaging a pin 38 (Figure 5) fast on the wheel's axles, so that the latch 31 and pin 38 provide an up-lock, when the undercarriage is retracted, and the wheels come against a stop on the aircraft frame.

The pins 22 on the upper end of the leg 1 are each connected to a guide arm 39 pivotally attached at 40 to the aircraft, the said guide arms forming the point of pivotal attachment of the undercarriage leg to the aircraft. Mounted on the pins 22 is a latch lever 41 adapted to engage a pin 42 on the aircraft, when the undercarriage is lowered so as to provide a down-lock.

Pivotally attached at 43 to the aircraft is one end of a subsidiary jack 44, the other end of which has lost motion connection with the guide arms 39, for example through a radial slot 45 in a lug 46 carried by said arms. The subsidiary jack has connected thereto a link 47 which is pivotally attached at its other end to the down-lock latch 41.

With such a construction, it will be appreciated that, when the undercarriage is lowered (Figure 4), the retraction jack 25 is extended and the subsidiary jack 44 closed, the pins 22 on the upper end of the leg 1 being held in the half bearings 23 fast with the aircraft by the down-lock latch 41, and in this position a negligible load will be exerted on the retraction and subsidiary jacks and the guide arms, both during landing and taxiing of the aircraft.

When it is desired to retract the undercarriage to the position shown in Figure 5 the subsidiary jack 44 is extended and, due to its lost motion connection, during the first part of its extension, the jack moves in the slot 45 causing the link 47 to unlock the down latch. Further movement of the subsidiary jack moves the point of attachment 40 of the guide arms 39 so as to bring the guide arms into prolongation with the leg 1 and resilient strut 2, and then, together with the action of the main retraction jack 25, retracts the leg, and, as the leg is reaching the retracted position, the up-lock latch 31 engages the pin 38, on the wheel axles, to provide an up-lock, which will be broken by the initial movement of the main retraction jack 25 during its extension for the lowering of the undercarriage.

This movement is illustrated more in detail in Figs. 4A and 5A, the former of which shows the parts in lowered position and the latter of which shows the parts in the retracted position of the undercarriage. When the undercarriage is retracted, the main jack 25 is closed so that the pin 6 is held in the outer or upper end of the slot 54 of the piston jack 24, while the hook 31, integral with the lever 32, holds the pin 38 on the bogie 52 to which the wheel axle 55 is fixed. The slot 54 is shown in dotted lines in Fig. 4 and is clearly indicated in solid lines in Figs. 4A and 5A. Upon lowering the undercarriage, the jack 25 is extended, and the first outward movement of the piston rod 24 allows the pin 6 to slide in the slot 54 while at the same time the pin 37 turns the projection 36 of the lever 34 about its pivot 35, carrying the arms 33 and 32 with it against the bias of the spring 55, thus moving the hook 31 in a clockwise direction from and releasing the up-lock pin 38. Further outward movement of the piston rod 24 will now allow arms 27 and 29 to pivot about the pivot point 26, as shown in Fig. 4A, thus pivoting the strut 4 around the pin 6 in a clockwise direction into the lowered position of the undercarriage as shown in Figs. 4 and 4A.

It will be appreciated that, in this arrangement the subsidiary jack 44 will oppose the main jack 25 during part of the raising of the undercarriage but the slot 45 may be arranged so that the subsidiary jack 44 may slide in the slot with lost motion and thus not oppose the main jack.

The main retraction jack 25, instead of being coupled indirectly to the bracing member 4 through arm 29, can be arranged to act directly on the bracing member, for example, by pivoting the jack between the pins 28 on the aircraft and the pins 30 on the bracing member, whilst again the auxiliary jack for moving the point of attachment of the guide arms, when the angle between the guide arms and the undercarriage leg is larger than 180 degrees, can be omitted.

In the arrangement shown in Figure 6 a single jack is used for retraction and lowering of the undercarriage. In this figure parts similar to the parts in the previous constructions are shown with the same reference numeral, so that the undercarriage leg 1 comprises the resilient telescopic strut 2 carrying the wheels. The top of the leg again terminates in pins 22 which are adapted to be held, when the undercarriage is lowered, in half bearings on the aircraft. 3 is again the lug provided on the undercarriage leg and one end of the bracing member 4 is pivotally connected to the lug 3 and the other end to the aircraft at 6.

The upper end of the leg 1 is pivotally connected to a guide arm 39 pivotally attached at 40 to the aircraft.

The single jack 50 is provided which is pivotally connected at one end to the leg 1 and at the other end is pivotally attached to the bracing member 4 by a pin 51. In this arrangement it is unnecessary to provide external locks, the undercarriage being held in both the lowered and retracted positions by internal locks (not shown) provided in the jack 50.

The jack 50 is closed when the undercarriage is lowered, as shown in full lines, Figure 6, and when the undercarriage is retracted the jack is extended as indicated in chain dotted lines, Figure 6, the respective positions of the numbered parts in the latter case being indicated by the suffix "a."

When the undercarriage is lowered, that is to say, during landing and taxiing, substantially the whole load of the undercarriage is transmitted by the load transmitting bearings 11 (Figs. 1-3) or 22 (Figs. 4-6). In this connection, attention is invited to the fact that in Figs. 1, 2, and 3 the thrust of the bearings 11 is taken up by the elongated slots 12, formed in the aircraft, and which slots are nearly perpendicular to the line of thrust through the undercarriage leg 1. In Figs. 4, 5, and 6, the load transmitting bearings 22 engage the half bearings 23, shaped as shown in broken lines in Fig. 5, and loads on the undercarriage are thus transmitted to the aircraft through the half bearings 23 and through the pivot pins 6 of the fixed length bracing member 4. Therefore, the guide arms 15 (Figs. 1-3) and 39 (Figs. 4-6) are subjected to substantially negligible loads.

The means for positioning the landing wheels of the aircraft as shown in the drawings form no part, per se, of the present invention, and in connection with this feature attention is invited to the copending application of Christopher B. V. Neilson et al. Ser. No. 245,192, filed September 5, 1951.

We claim:

1. In combination with an aircraft, a retractable undercarriage comprising a leg, load transmitting means carried by said leg, load bearing means carried by the aircraft and engaging with said leg to hold it in a predetermined position on the aircraft when the undercarriage is lowered, a bracing member of fixed length pivoted at one end to the aircraft and at the other end to said leg, guide means pivoted to the aircraft and to said leg for guiding said leg during lowering and retraction of the undercarriage, and means connected to and reacting between the aircraft and said undercarriage for raising and lowering the undercarriage, said load transmitting means in engagement with said load bearing means, together with said bracing member transmitting substantially the entire landing loads of said undercarriage to the aircraft.

2. The combination according to claim 1 in which the means for raising and lowering the undercarriage comprises a fluid pressure operated jack connected pivotally at one end to said bracing member.

3. The combination according to claim 1 in which said bracing member is rigid and said load transmitting means is mounted relative to the aircraft for movement from said predetermined position during retraction of said undercarriage.

4. The combination according to claim 1 in which said bracing member is rigid and said load transmitting means is mounted relative to the aircraft for movement from said predetermined position during retraction of said undercarriage, said guide means comprising a guide arm pivotally connected to the aircraft and having means connecting it to said leg.

5. The combination according to claim 1 in which said bracing member is rigid and said load transmitting means is mounted relative to the aircraft for movement from said predetermined position during retraction of said undercarriage, said guide means comprising a guide arm pivotally connected to the aircraft and to said leg, said means for raising and lowering the undercarriage comprising a fluid pressure operated jack pivotally connected at one end to said bracing member, and a subsidiary jack connected between said guide arm and the aircraft and adapted to move said guide arm to assist in raising and lowering the undercarriage.

6. The combination according to claim 1 in which said load transmitting means comprises bearings for said leg, said load bearing means comprising slots formed in the aircraft.

7. The combination according to claim 1 in which said bracing member is rigid and said load transmitting means is mounted for movement from said predetermined position during retraction of said undercarriage, said load transmitting means comprising a yoke having lugs on either side thereof, said guide means comprising a guide arm pivoted to each of said lugs, and torque bars pivotally mounted on the aircraft and to each of which one of said guide arms is fixed.

8. The combination according to claim 1 in which said bracing member is rigid and said load transmitting means is mounted for movement from said predetermined position during retraction of said undercarriage, and means on said leg for holding it fixed in said predetermined position relative to the aircraft for load transmitting purposes when the undercarriage is lowered.

9. The combination according to claim 1 in which said means for raising and lowering the undercarriage comprises a fluid pressure operated jack pivotally connected at one end to said bracing member, said means for raising and lowering the undercarriage comprising a guide arm pivotally connected to said leg, and said leg while retracted being supported by said guide arm.

10. The combination according to claim 1 in which said means for raising and lowering said undercarriage comprises a fluid pressure operated jack pivotally connected at one end to said bracing member, and a pivotal link system connecting said jack to said bracing member.

References Cited in the file of this patent

UNITED STATES PATENTS

| Number | Name | Date |
|---|---|---|
| 2,351,284 | Overbeke | June 13, 1944 |
| 2,360,535 | Ashton | Oct. 17, 1944 |
| 2,374,146 | Waters | Apr. 17, 1945 |
| 2,471,603 | Bishop | May 31, 1949 |
| 2,474,694 | Saulnier | June 28, 1949 |
| 2,476,154 | Lohs | July 12, 1949 |
| 2,481,379 | Zimmerman | Sept. 6, 1949 |
| 2,487,598 | Saulnier | Nov. 8, 1949 |
| 2,490,485 | Spaeth | Dec. 6, 1949 |
| 2,497,880 | Gassner | Feb. 21, 1950 |
| 2,504,458 | Schmidt et al. | Apr. 18, 1950 |
| 2,511,528 | Clark et al. | June 13, 1950 |
| 2,550,028 | Wells | Apr. 24, 1951 |
| 2,565,007 | Van Zelm | Aug. 21, 1951 |

FOREIGN PATENTS

| Number | Country | Date |
|---|---|---|
| 946,653 | France | Dec. 27, 1948 |